United States Patent

[11] 3,581,193

[72] Inventor  Gunther R. Laukien
                Forchheim Karlsruhe, Germany
[21] Appl. No. 772,979
[22] Filed     Nov. 4, 1968
[45] Patented  May 25, 1971
[32] Priority  Nov. 2, 1967
[33]           Germany
[31]           B95210

[54] PULSE SPECTROMETER EMPLOYING SEQUENCES OF SYNCHRONIZED MODULATED PULSES
15 Claims, 1 Drawing Fig.

[52] U.S. Cl. ............................................... 324/0.5
[51] Int. Cl. ............................................... G01n 27/78
[50] Field of Search .................................. 324/0.5

[56] References Cited
OTHER REFERENCES

W. G. Clark "Pulsed Nuclear Resonance Apparatus" Rev. of Sci. Instr. 35(3), March '64, pp. 316— 333

*Primary Examiner*—Michael J. Lynch
*Attorney*—Craig, Antonelli, Stewart & Hill

ABSTRACT: Pulse spectrometer, preferably for measurement of nuclear resonance of a material, having one or many high frequency measuring channels or having variable high frequency measuring ranges, characterized in that all pulse spacing periods within the pulse measuring programs and the HF carrier frequency of the HF pulses employed are derived from a common source of high frequency oscillations, so that the pulses commence only at specific, i.e. statistically nonfluctuating, phase values of the HF carrier frequency.

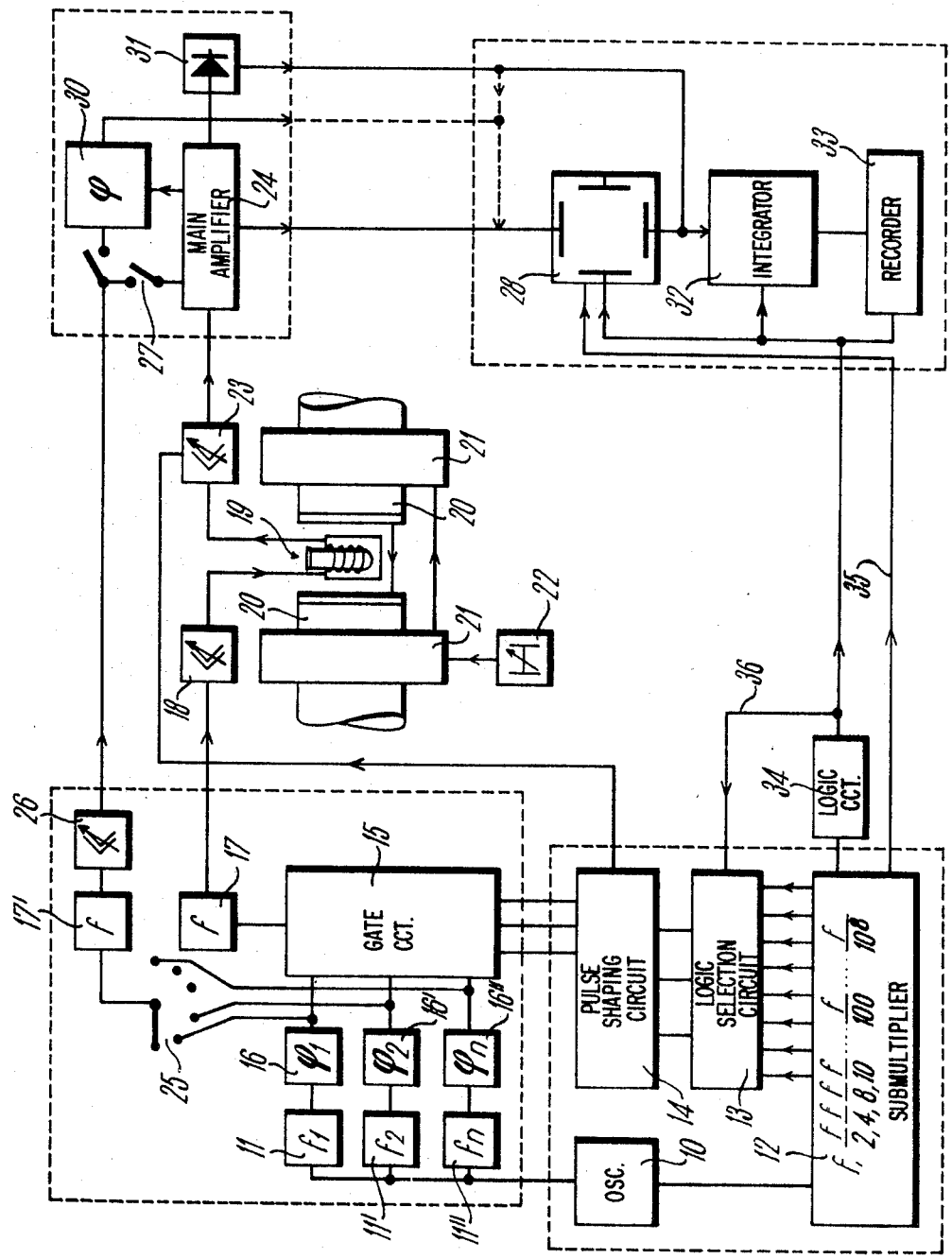

PULSE SPECTROMETER EMPLOYING SEQUENCES OF SYNCHRONIZED MODULATED PULSES

The invention relates to a pulse spectrometer, particularly for measuring nuclear resonances, with a transmitter for the production of high frequency pulse sequences, the carrier frequency of which can be adjusted to one or several fixed values or can be constantly tuned within certain ranges.

Pulse spectrometers are employed, inter alia, for the spectroscopy of nuclear resonances. Atomic nuclei with a magnetic moment other than zero execute a Larmor precession in an external magnetic field and exhibit a macroscopic magnetization M. In case of nuclear resonance, this magnetization is altered, due to excitation of the nuclei, by an alternating field, the frequency of which is in the range of the precession frequency. This change in the macroscopic magnetization M is measured, for example, with the aid of an induction coil By the use of a pulse-shaped field of excitation, the reactions of the nucleus to this field can be clearly separated from the effects of this field proper.

A pulse spectrometer suitable for such measurements, i.e., one which produces high frequency pulse sequences for the excitation of the nuclei, is described in "Handbuch der Physik" (Manual of Physics), published by S. Fluegge, Berlin, Goettingen, Heidelberg, 1958, Vol. 38/1, in the contribution by G. Laukien on pages 216 et seq. In one embodiment of the conventional pulse spectrometer, a high frequency transmitter is directly excited by a pulse generator. In this case, the phases of the individual high frequency wave trains are scattered, so that there is no coherence whatsoever between the individual wave trains. Therefore, this mode of pulse generation is called incoherent. In addition to exhibiting this deficiency in coherence, this mode of operation has the disadvantage that directly modulated oscillators exhibit a poor frequency stability. This disadvantage, though, is avoided in another construction of the conventional pulse spectrograph, wherein the output signal of a continuously operating oscillator is pulse-shape modulated. In this case, a satisfactory frequency stability and a phase coherence of the oscillations in the individual high frequency pulses are attained; however, here the high frequency exhibits a statistically varying initial phase with respect to the position of the ascending flank of the pulses. Consequently, the pulse widths and the variations of the angles of rotation of the magnetization dependent on the pulse width also fluctuate statistically. In the last-mentioned embodiment of the conventional arrangement, the pulses serving for modulation purposes are produced with the aid of several independent multivibrators; by means of these multivibrators, the pulse widths and pulse intervals can be set, so that no relationship exists between the phase of the high frequency oscillation and the ascending flanks of the pulses.

The invention is based on the problem of avoiding these disadvantages of the conventional pulse spectrometer, and to provide a pulse spectrometer wherein, with a high frequency stability and phase coherence, the high frequency oscillation always exhibits the same phase relationship with respect to the initial flank of the pulse.

This problem is solved, in accordance with the invention, by providing a high frequency source of base oscillation, from which are derived both the carrier frequency and the duration and spacings of the pulses of the pulse sequence. Due to this manner of derivation, there is also obtained a fixed dependence between the high frequency carrier frequency and the pulses derived from the base frequency, so that the phase of the carrier frequency is the same at the onset of each pulse.

In one embodiment of the invention, the source of base frequency is constituted by a quartz-controlled oscillator. In place thereof, it is also possible to employ an oscillator which can be tuned continuously or in stages, in particular a frequency synthesizer.

In a preferred embodiment of the invention, the carrier frequency is derived from the base frequency with the aid of frequency multiplier stages, but here again, a frequency synthesizer could also be employed for this purpose.

As mentioned above, high frequency pulse sequences are produced in the pulse spectrometer of this invention, which sequences consist of individual pulses or of practically endless pulse sequences, but in some cases also of a specific number of individual pulses with predetermined widths and varying spacings (see, in this connection, also Hans Strehlow, "Berichte der Bunsen-Gesellschaft" [Reports of the Bunsen Society], Vol. 67, 1963, p. 255). The construction of the pulse spectrometer in accordance with the invention makes it possible in a particularly simple manner to produce pulse sequences in accordance with a predetermined program. For this purpose, the provision is made, in a further development of the invention, that a submultiplier (divider or divider clock) is connected to the source of base frequency for the production of timing signals, which latter determine the duration and spacing of the pulses in the pulse sequence. This submultiplier can be a chain of binary and/or decadic dividers, at the outputs of which the individual time signals can be derived. All of these time signals are accordingly derived from frequencies synchronous with respect to the base frequency, and thus also synchronous with respect to one another. In order to form the pulse program, the time signals are preferably selected with the aid of a logic selection circuit connected to the submultiplier, and the timing signals necessary and selected for a specific pulse sequence are fed to a pulse shaping stage.

The logic selection circuit allows only part of the timing signals to pass through, which then serve as trigger signals for switching the pulse shaping stage on and/or off. Then, a gate circuit can advantageously be connected to the pulse shaping stage; the carrier frequency is fed to this gate circuit, and the gate circuit is periodically opened by the signals produced by the pulse shaping stage in order to produce the high frequency pulse sequence.

The time signals supplied by the pulse shaping stage can also be employed for controlling the mode of operation of the pulse spectrometer of the invention. Thus, one embodiment of the invention provides that an additional logic selection circuit is connected to the submultiplier, with the aid of which timing signals produced by the submultiplier are selected and fed to the first logic selection circuit and the output units for the starting, terminating and repetition of a pulse program. Furthermore, the pulse shaping stage can produce control pulses for opening and blocking the measuring receiver of the pulse spectrometer, and these pulses can be fed to the measuring receiver.

In case of pulse spectrometers for the measurement of nuclear resonances, the carrier frequency is, for example, 60 or 100 megacycles. The external magnetic field, wherein the sample to be subjected to spectroscopy is disposed, is selected in such a manner in view of the carrier frequency employed that nuclear resonance takes place. In general, the high frequency pulses fed to the sample exhibit a rectangular definition and a length in the range of from 1 to 10 microseconds.

The invention will be described and explained in greater detail below with reference to the embodiment illustrated in the drawing. The drawing shows a schematic block diagram of a pulse spectrometer in accordance with the invention.

The pulse spectrometer shown as an example in the drawing includes a base frequency source or clock 10, constituted, for example, of a quartz-controlled base oscillator or a frequency decade circuit or synthesizer; from the frequency of this source 10, the modulating pulses as well as the high frequency carrier of the high frequency pulses necessary for the spectroscopy procedure are derived. This basic frequency source 10 provides an output, for example, having a frequency of 1 megacycle. In order to produce the high frequency frequency, the output signal of the base oscillator 10 is fed to a high frequency generator 11, for example a multiplier or a frequency decade circuit, which increases the frequency of the base oscillator to, for example, 30 megacycles.

In order to produce the modulating pulses, a second output of the base frequency source 10 is connected to a submultiplier 12 provided with binary and/or decadic divider stages producing a time signal system in the range of 1 microsecond to 100 seconds with the stages 2, 4, 8 and 10 in each decade. With the aid of a logic selection circuit 13 connected to the submultiplier 12, those time signals can be selected from the time signals delivered by the submultiplier 12 which are necessary for a desired pulse program. In this manner it is possible to select the various pulse sequence programs for the respectively desired experiments, and to selectively compose these programs. The thus selected time signals are then fed to a pulse shaping stage 14 which shapes the time signals into rectangular DC pulses of a selectable duration. Then, the desired pulse program appears at the output of the pulse shaping stage 14, which program can be utilized for the modulation of the high frequency carrier generated by source 11. The base oscillator 10, the submultiplier 12, the logic selection circuit 13 and the pulse shaping stage 14 consequently represent a program generator.

The transmitter serving for the production of high frequency pulses required for the pulse spectroscopy comprises, in addition to the high frequency generator 11, a gate circuit 15 to which is fed the high frequency carrier signal from the output of the high frequency generator 11, and which gate circuit is, furthermore, controlled with the aid of the pulses derived from the pulse shaping stage 14 in such a manner that this gate circuit is open during the duration of these pulses and delivers high frequency pulses at the output having the frequency produced by the high frequency generator 11. Thus, these pulses are effective as a modulation of the HF carrier frequency. As a result, high frequency pulse groups of a selectively determined duration and with selectively determinable spacings therebetween leave the gate circuit 15 and are fed to the sample. In this connection, it is of importance that all pulses exhibit identical phase relationships.

The high frequency pulses from switching circuit 15 exhibit the same values with respect to the phase relationship of the high frequency at the ascending flank, and the high frequency is phase-coherent. The phase coherence results from the fact that the high frequency carrier of the pulses is formed by parts of a constant, high frequency oscillation, whereas the fixed phase relationship of the high frequency pulses results from the fact that the high frequency carrier oscillation as well as the time signals determining the onset of the high frequency pulses are derived from the same base oscillation, and accordingly all pulse intervals are integral multiples of the cycle of a frequency, the integral multiple of which is the high frequency carrier frequency. This frequency generally lies below the base frequency.

The high frequency pulses in the form of successive pulse groups appearing at the output of the gate circuit 15, which pulses are selected in accordance with a specific program by the logic selection circuit 13, are fed optionally through a multiplier 17 to a sample head 19 by way of a power amplifier 18; this sample head 19 is disposed in a magnetic field between the poles 20 of an electromagnet, the field coils 21 of which are supplied by a power supply unit 22. From the high frequency pulse sequence altered by the sample, modified pulse sequences are derived, which sequences are fed, by way of a preamplifier 23, to the main amplifier 24 of a receiver.

In case a heterodyne reception is to take place, it is possible to feed to the main amplifier the pure carrier frequency from the transmitter, which carrier frequency is contained in the selected pulse program. For this purpose, an additional multiplier 17' can be connected to the high frequency generator 11 of the transmitter with the aid of a switch 25; this multiplier corresponds to the multiplier 17 of the channel for the pulse sequence leading to the power amplifier 18 and the sample 19. The high frequency oscillation serving as the reference or beat oscillation passes from the multiplier 17', by way of an amplifier 26 and an additional switch 27, to the main amplifier 24. The output signal of the main amplifier 24, which is converted to an intermediate frequency, can be fed, for example, directly to an oscillograph 28; to the latter are fed calibration markers directly from the submultiplier 12 by way of the line 29, and trigger signals by way of a further logic selection circuit 34 and the line 35.

Depending on the type of information to be obtained with the aid of the pulse spectrometer, the output signal of the main amplifier 24 can also be rectified by means of a phase detector 30 or a diode circuit 31 and then indicated on the oscillograph 28 after rectification step, or recorded in some other manner. Thus, the integrator 32, for example, makes it possible to obtain a selective integration which, in turn, makes it possible, for example, to select from a descending curve or from a succession of echos the measuring points which are actually of interest, for example, the maximum echo heights. The contour of a succession of echos can be recorded, for instance, with the aid of a recorder 33.

As mentioned above, the submultiplier 12 yields a vary of timing signals, from which predetermined timing signals can be selected with the aid of the logic selection circuit 13. These timing signals are digital signals, so that the logic selection circuit can be formed also from digital circuits, and there is the possibility to automatize the mode of operation of the pulse spectrometer of this invention, with the use of conventional digital technique, by setting a program, according to which the pulse spectrometer executes experiments. In this connection, it is possible to repeat the same pulse sequences several times, or to constantly vary the pulse sequences according to a specific program. The trigger signals required for this purpose are derived, in the illustrated embodiment, from the additional logic selection circuit 34 and fed, via line 36, to the first logic selection circuit 13. The measuring results which are repeated several times in such an automatic process can be recorded one above the other, for example, for decreasing the noise level, or they can be electronically evaluated by means of suitable evaluating devices which are not illustrated in detail.

The pulse spectrometer illustrated as an embodiment furthermore affords the possibility to vary the phase relationship and/or the frequency of the carrier signal from pulse to pulse in a pulse sequence. For this purpose, several high frequency channels are provided between the base frequency source 10 and the gate circuit 15, each channel containing a high frequency generator 11 and 11' as well as 11'' and furthermore a phase shifter 16 and 16' as well as 16' With the aid of the high frequency generators 11 to 11'', it is possible to produce in the individual channels selectively either identical or differing carrier frequencies. Besides, by means of the phase shifters 16 to 16'', the phase relationship of the high frequency oscillation with respect to the pulses fed to the gate circuit 15 is adjusted so that it is phase-locked in each channel. With the aid of the logic selection circuit 13, the pulse shaping stage 14 and the gate circuit 15 it is then possible to select from each of the high frequency channels any desired number of pulses in any desired sequence, in order to compose them into a desired pulse program. Of particular interest are, for example, pulse sequences wherein successive pulses, though having the same carrier frequency, differ in phase relationship by specific amounts, for example 90° or 180°. In this case, the high frequency generators 11, 11' and 11'' are set to the same frequency, and the desired phase difference is obtained with the aid of the phase shifters 16 to 16''.

As an example, for a pulse sequence which can be selected in the pulse spectrometer of the invention, the Carr-Purcell pulse sequence is to be mentioned, consisting of a first pulse of the duration $t$ and a number of additional pulses of the duration $2t$. The spacing between the first pulse of the duration $t$ and the first pulse of the duration $2t$ is A, whereas spacing between the pulses with the duration $2t$ is 2A. This pulse sequence is of advantage for a number of experiments. This sequence could be produced, for example, by deriving from the submultiplier 12 equidistant timing signals of an alternatingly positive and negative polarity, of which the first positive time signal finds an open gate in the logic selection circuit 13, which gate is closed by this signal after passage therethrough, whereas the negative pulses are all allowed to pass through. In the subsequent pulse shaping stage, the first and only timing signal which has passed the gate then produces a pulse of the duration $t$, whereas the subsequent negative timing signals produce pulses of the duration $2t$.

With the aid of the program generator of the pulse spectrometer of this invention, it is also possible to produce other pulse sequences, such as, for example, triplet sequences which can consist, for instance, of a starting pulse and a succession of triplets, each of these triplets comprising two equally long pulses and a longer pulse positioned in the middle. In addition to the timing signals for producing the desired pulse sequence, as well as the timing signals and carrier signals for the oscillograph 28, the integrator 32 and the recorder 33, it is also possible to derive from the base oscillator 10 and the submultiplier 12 further control pulses. For example, it is possible to actuate the main amplifier only when an interesting bit of information is to be expected.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

I claim:

1. A pulse spectrometer, preferably for measuring the nuclear resonance of a sample, comprising:
   a primary source of RF oscillations,
   means for producing an RF carrier signal in synchronism with said RF oscillations,
   program control means, responsive to said RF oscillations produced by said primary source, for generating a consecutive series of pulse groups having selectively variable spacing and length,
   synchronizing means coupled to said primary source of RF oscillations and to said program control means for synchronizing the pulses of said pulse groups with said RF oscillations,
   transmitter means connected to said means for producing an RF carrier signal and said program control means for modulating said RF carrier signal by said pulse groups to produce a series of pulse modulated signals, and
   magnetic testing means for applying said pulse modulated signals to said sample and for detecting nuclear resonances produced therein.

2. A pulse spectrometer as defined in claim 1 wherein said primary source is a crystal controlled base oscillator.

3. A pulse spectrometer as defined in claim 1 wherein said primary source is an oscillator which can be tuned continuously.

4. A pulse spectrometer as defined in claim 1 wherein said program control means includes a frequency submultiplier connected to said primary source of generating output signals of selectively variable duration and rate to form said pulse groups.

5. A pulse spectrometer as defined in claim 4 wherein said means for producing an RF carrier signal includes a multiplier connected to said primary source for producing said RF carrier signal and said transmitter means includes gating means connected to said multiplier and responsive to said output signals for gating said carrier signal to form said pulse modulated signals.

6. A pulse spectrometer as defined in claim 1, wherein said means for producing an RF carrier signal includes a frequency synthesizer for providing said RF carrier signal from which said pulse modulated signals are derived.

7. A pulse spectrometer as defined in claim 1 wherein said program control means includes a series of frequency dividers connected to said primary source for providing signals whose frequencies are mutually synchronous with the frequency produced by said primary source for selective application to said transmitter means.

8. A pulse spectrometer as defined in claim 7 wherein the outputs of said frequency dividers are selectively connected to first logic circuit means for permitting only selected ones of the pulses derived from the divided frequencies to pass in accordance with a given program, and pulse shaping means connected to said logic circuit means for shaping the pulses derived therefrom.

9. A pulse spectrometer as defined in claim 8, wherein said transmitter means includes gating means connected to said pulse shaping means and responsive to said pulses for gating said RF carrier signal to form said series of pulse modulated signals.

10. A pulse spectrometer as defined in claim 9 further including additional logic circuit means connected to said frequency dividers for providing control signals to start, terminate and repeat a program in said first logic circuit means.

11. A pulse spectrometer as defined in claim 1 wherein said means for producing an RF carrier signal includes a plurality of high frequency channels connected to said primary source and said transmitter means includes gating means responsive to said pulse groups produced by said program control means connected to said channels for gating said carrier signals in selectable succession.

12. A pulse spectrometer as defined in claim 11 wherein said high frequency channels each provide carrier signals of different frequency.

13. A pulse spectrometer as defined in claim 11 wherein said high frequency channels each provide carrier signals having a different phase.

14. A pulse spectrometer as defined in claim 11 wherein each high frequency channel includes at least one multiplier an done phase shifter.

15. A pulse spectrometer as defined in claim 1 wherein said primary source is provided in the form of a frequency synthesizer.